UNITED STATES PATENT OFFICE.

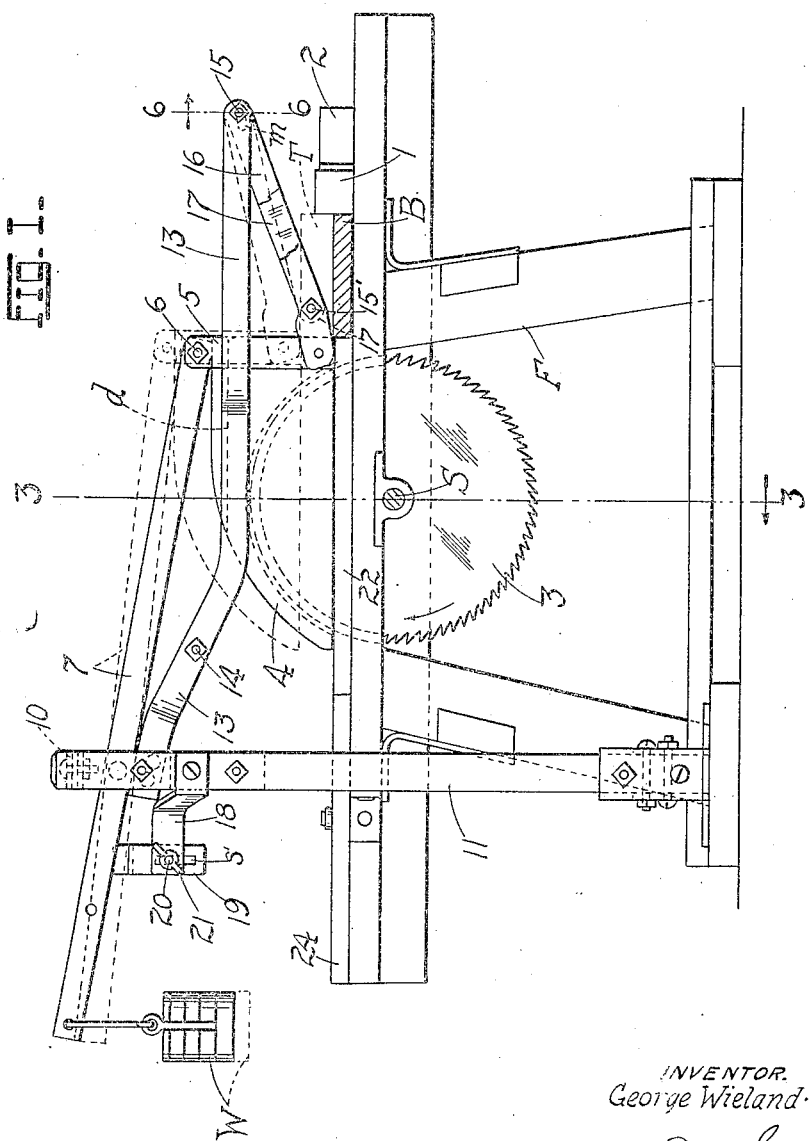

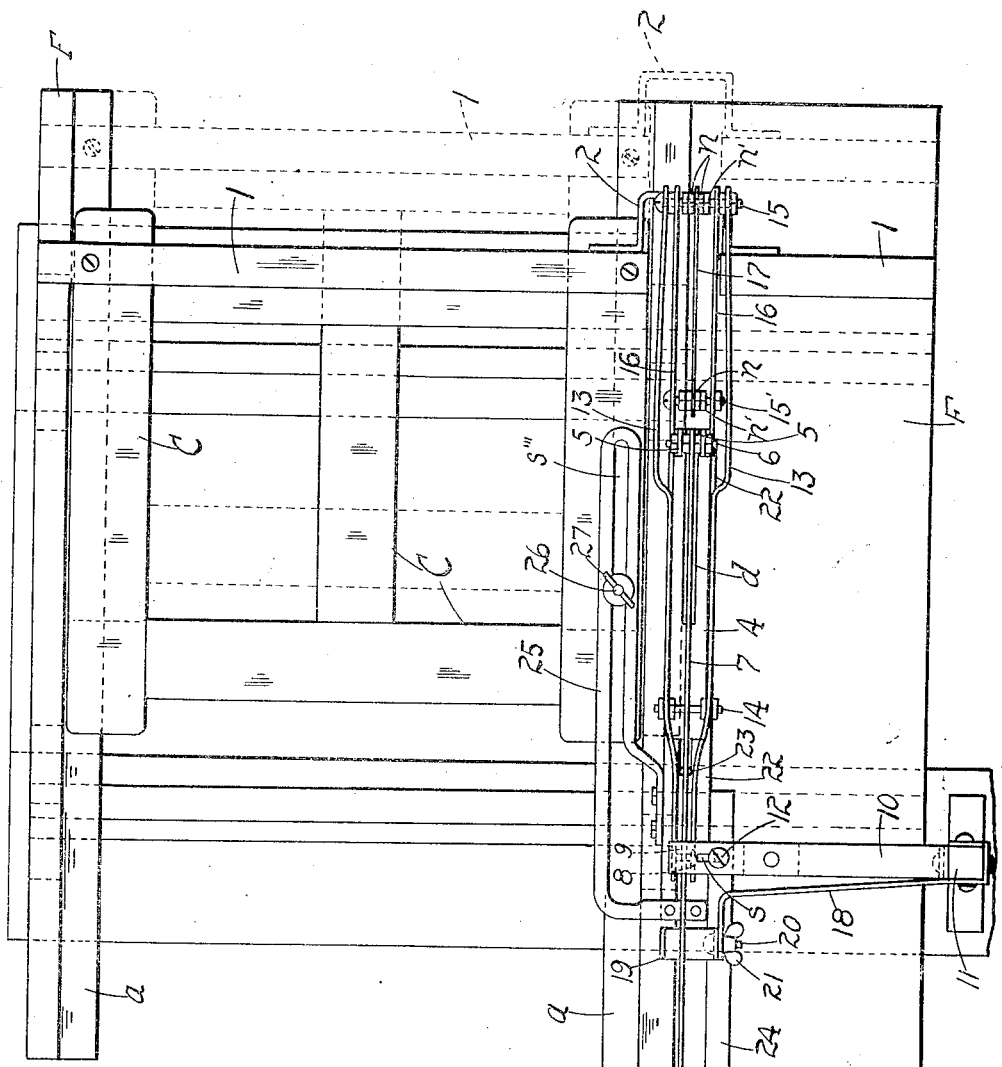

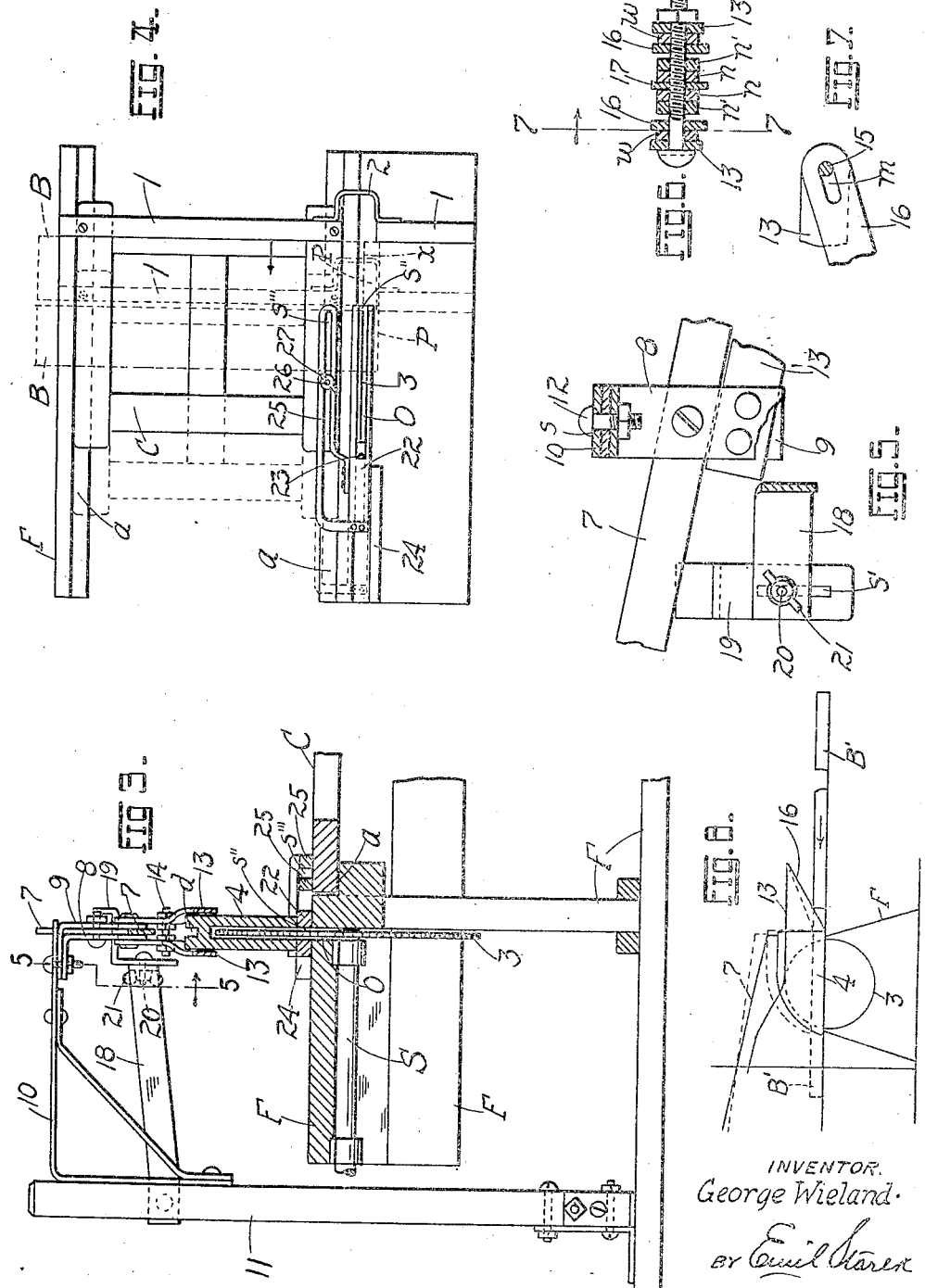

GEORGE WIELAND, OF ST. LOUIS, MISSOURI.

SAW-GUARD.

1,351,820.   Specification of Letters Patent.   Patented Sept. 7, 1920.

Application filed December 5, 1919. Serial No. 342,594.

*To all whom it may concern:*

Be it known that I, GEORGE WIELAND, a citizen of the United States, residing at St. Louis, State of Missouri, have invented certain new and useful Improvements in Saw-Guards, of which the following is a full, clear, and exact description, reference being had to the accompanying drawings, forming a part hereof.

The present invention is directed to improvements in saw-guards, particularly for the rotary or circular variety of saw such as the cross-cut and rip saw, the object of the invention being to provide a guard which will be highly efficient as a safety appliance, preventing as it does any possible contact of the saw with the fingers or hands of the operator. A further object is to provide a guard in which the casing or hood surrounding the saw blade is made yielding to accommodate variable thicknesses of stock or lumber to be cut, suitable provision being made however to prevent at all times any material vertical displacement of the casing, or what would be sufficient to uncover the saw. A further object is to provide a guard which will permit the severing of small sections or pieces from the stock or board fed to the saw without the danger of cutting the fingers of the operator during the act of removal of said pieces. A further object is to provide a guard with the hood or casing of which there coöperates a complementary member adjustably secured to the traversing table or carriage on which the stock or board to be cut is deposited, said member operating, with the return or back stroke of the carriage, to eject or push from under the casing the section which is severed from the stock on the forward stroke, bringing said severed section to a position beyond the cutting edge of the saw blade, and in front of the casing, the said ejecting member at the same time covering the portion of the blade between the bottom of the casing and the top of the bed of the machine which would otherwise be left exposed; so that when the operator seizes the severed piece he can do so without any danger of his fingers being caught by the teeth of the saw blade. One end of the ejecting member aforesaid serves as a bearing for the inner edge of the board or stock deposited on the carriage during the feeding of the stock to the saw. The device is further provided with an indicating strip or plate adjustable into the plane of rotation of the saw blade so as to indicate the position of the blade which is normally concealed by the guard casing. The advantages of the invention will be fully apparent from the following detailed description in connection with the accompanying drawings in which—

Figure 1 represents a side elevation of a sawing machine showing my invention applied thereto; Fig. 2 is a top plan thereof; Fig. 3 is a vertical transverse section on the line 3—3 of Fig. 1; Fig. 4 is a top plan on a reduced scale, of the bed or frame and its saw, and the feed carriage, the casing or guard and parts coupled thereto being removed; Fig. 5 is a vertical sectional detail on the line 5—5 of Fig. 3; Fig. 6 is an enlarged sectional detail on the line 6—6 of Fig. 1 showing the supporting screw stem for the indicator strip mounted in front of the saw; Fig. 7 is a cross-sectional detail on the line 7—7 of Fig. 6; and Fig. 8 is a diagrammatic side elevation showing the application of a rip saw to a piece of lumber fed lengthwise thereto.

Referring to the drawings, and for the present to Figs. 1 to 7 inclusive, F represents any conventional form of timbered frame forming a bed or support for the traversing table or feed carriage C, the latter being capable of a forward and backward sliding movement in the recesses or ways $a$, $a$, formed in the upper longitudinal timbers of the frame. The front end of the carriage is provided with a transverse guide rail 1 extending across the bed, the said rail being made in two sections connected by a U-shaped strap 2 opposite the plane of rotation of the saw 3 and its casing or hood 4. As well understood in the art, the saw projects partly above the working plane of the bed and partly below said plane, being carried at one end of the shaft S mounted on the frame F below said working plane and driven from any suitable source of power (not shown). As best seen from Figs. 1 and 3, the casing 4 forming the saw guard is a flat box or hood with a straight front and a flat bottom, the convexed roof thereof being formed with an outer longitudinal depression or groove $d$ extending from the front, rearward to about the middle of the arched roof of the casing (Fig. 1). This depression however is not indispensable, the specific purpose thereof in the present construction being made apparent later on in the description. The hood 4 is pivotally suspended from the top of its front end by means of the straps 5, 5, disposed on the opposite side walls of the hood, the upper ends of the straps projecting above the hood and being connected by a pin or bolt 6 to which is pivotally secured the front end of a vertically oscillatable lever 7 fulcrumed between suitable angle brackets 8, 9, at the free end of an arm 10 projecting horizontally from and suitably braced to, a post 11 disposed adjacent the rear left hand corner of the frame (Fig. 2) or at any other convenient point to permit the proper mounting of the said lever. To permit of accurate adjustment of the brackets along the arm 10, the latter as well as the horizontal legs of the brackets are provided with elongated slots $s$ for the accommodation of the fastening bolt 12 (Fig. 2) as well understood in the art. The lever 7 is a lever of the first class, the short arm thereof being weighted by a weight W composed of a number of sections as well understood in the art.

The vertical legs of the brackets 8, 9, extend below the lever 7 (Fig. 5), the bottom portions having rigidly secured thereto along their outer faces the fixed terminals of the rigid arms 13, 13, bent to loosely span the sides of the hood or casing 4, the said arms being disposed adjacent to the upper portion of the hood for a normal position of the latter, and projecting forwardly a suitable distance in front of the hood (Fig. 1). At a convenient point the said arms are tied and braced by a screw-bolt 14 or otherwise. The free front ends of the guide arms 13 are connected by a threaded bolt or pin 15 to which on either side of the center thereof are loosely coupled the front ends of a pair of links 16, 16, the opposite or inner ends of said links being pivotally coupled to the straps 5, 5, at the lower front corner of the hood or casing 4, the connection being made on the sides of the casing (Fig. 1). Suitable washers $w$ keep the links 16 spaced from the arms 13.

Passed loosely over the pin 15 near the center thereof is the outer or upper end of a plate or flat strip 17, the same being bounded by the suitable adjusting and lock nuts $n$, $n'$, respectively, the inner and lower end of said strip being similarly secured to a screw-bolt or pin 15' connecting the links 16 at a point adjacent to the front of the casing 4, said lower end being likewise controlled by suitable adjusting and lock nuts $n$, $n'$, as shown (Fig. 2). In practice the said strip is adjusted horizontally by the nuts $n$ so as to lie in the plane of rotation of the saw, the strip thereby serving as an indicator of the true position of the saw, and serving likewise as a guide to the operator when feeding the boards or other stock to the saw, it being obvious of course that the saw shall cut the lumber or board along a line lying in the plane of the indicator strip. As seen from the drawings, the links 16, 16, together with the indicator strip 17 incline rearwardly and downwardly for a purpose to presently appear. Projecting from the post 11 and extending over the bed of the machine is a bent arm or bracket 18 to the free end of which is secured an angle piece 19 operating as a stop for the lever 7, the said stop being vertically adjustable by means of the slot $s'$ through which the stem of the clamping bolt 20 passes, a wing nut 21 securing the stop piece in place when once adjusted. It is well known that in cutting warped pieces of lumber the same often kick back under the action of the saw and force the hood upward, and were it not for the stop-piece 19 the hood might be thrown up to a point where the entire upper portion of the saw would be left uncovered, thereby exposing the workman to the sudden danger of having his hand or fingers come in contact with the saw and accidentally cut off. The stop-piece 19 is made adjustable so as to limit the vertical displacements of the hood under the related circumstances within safe limits, and for the further reason that in feeding thick pieces of lumber to the saw, the links 16 must necessarily yield vertically to permit the lumber to pass under the hood which is thus raised, this in turn lifting the long arm of the lever 7 and depressing the short arm.

The hood or guard casing 4 is so suspended from the weighted lever 7 as not to touch the bed of the machine, the straight bottom of the casing being separated from the surface of the bed by the thickness of what is here termed as the ejecting member, the same comprising a longitudinally slotted bar 22, the slot $s''$ of which receives the saw 3 and is substantially the width of the casing chamber (Fig. 3), the front end of the slot being open. The slot $s''$ is traversed by a stop-pin 23 projecting from the bed at a point adjacent to the opening O formed in the frame F for the passage of the saw (Fig. 4), the outer side of the ejecting bar being guided by a strip 24 nailed or otherwise secured to the bed of the frame F. The bar 22 has secured thereto a longitudinally slotted member 25 offset from the bar, the slot $s'''$ of said member being traversed by the stem of a stud-bolt 26 projecting from the carriage C, a wing-nut 27 serving to secure the member to the carriage at any point to which the member may be shifted or adjusted thereon. In practice the nut 27 is loosened and the member 25 shifted forward until the closed end of the slot $s''$ of the bar 22 to which the said member is secured strikes the pin 23, by which time the front ends of the bar 22 and member 25 come into transverse alinement with the front wall of the hood 4. By then depositing a board or other piece of lumber B (Fig. 1) on the carriage against the guard rail 1 and pushing the carriage back until the inner edge of the board engages the free ends of the members 22 and 25, and then clamping the member 25 by screwing down the nut 27, the board whatever be its width is snugly confined between the rail 1 and the front ends of the members 22, 25, which thus serve as bearings for the opposite edges of the board. The carriage may now be fed rearward so as to cause the board to pass under the hood 4 and be cut by the saw.

The operation is substantially as follows: In the present illustration (Fig. 1) a board B has been selected of a thickness substantially equal to the vertical dimension or thickness of the ejecting bar 22. When the carriage with its board is now pushed rearward so as to feed the board to the saw, it is obvious that the bar 22 will travel rearward with the carriage, allowing the board B to pass under the hood 4, the saw cutting the board along the line $x$ (Fig. 4) which line is directly under the indicator strip 17, assuming of course that this strip has been carefully adjusted to come into the plane of rotation of the saw. By the time the carriage has been pushed back sufficiently to bring the entire width of the board across the saw the latter will have cut through along the line $x$ and severed from the board a piece or section P (Fig. 4) which now occupies a position under the hood previously occupied by a length of the member 22 equal to the width of the board. In the absence of the member 22 the piece or section P thus severed would have to be removed from under the hood, the operator running the risk of getting his fingers in contact with the saw, especially if the severed piece were narrower than the size of section indicated in Fig. 4. If the piece severed say was no wider than the thickness of the side wall of the hood, there would be great danger of the operator in removing such a narrow strip to get his fingers in contact with the saw. With my improvement however, after the section P or other piece has been severed, the operator pulls back the carriage to its original position, whereupon the front end of the member 22 simply pushes the severed piece along with the main body of the board back to its original position (Figs. 1, 4,), the main body of the board B being pushed back by the front ends of the members 22 and 25. Of course where the section severed from the board is a large piece there is no danger in removing such severed section, the main danger lying in the attempt to remove narrow strips cut from the body of the board. After one piece has thus been severed, ejected and removed, the board B is moved lengthwise across the carriage to present another portion to the saw, it being understood that the board while in a measure snugly confined between the rail 1 and the members 22, 25, is nevertheless free to be moved longitudinally between these members which act as guides and bearings therefor as the same is moved across the carriage. As previously stated, any width of board may be deposited on the carriage, the members 22, 25, being adjustable to receive timbers or stock the maximum width whereof is substantially the length of the slot $s'''$ traversed by the stud 26 which limits the separating movement between the rail 1 and the front ends of the members 22, 25, by striking the front closed end of said slot. Any width of board between the limits of such separating movement may obviously be accommodated. Should the operator feed to the saw a board or timber thicker than the board B, this can readily be done because the links 16, 16, under which the timber must pass will simply be lifted, the hood 4 of course at the same time being raised to accommodate the increased thickness. The dotted position in Fig. 1 will serve the purpose of illustrating this point, assuming we introduced a timber T of considerable thickness under the links. The lever 7 being weighted, it follows that very little effort will suffice to elevate the links which obviously will guide the timber toward and under the hood, assuming the timber is introduced onto the carriage by moving it across the rail 1. Since the lever 7 for any oscillation necessarily describes the arc of a circle, in order to confine the hood to a vertical movement in parallel lines, the outer ends of the links 16, 16, and of the strip 17 are provided with elongated slots $m$, the slots permitting these members to yield to an extent determined by the arc described by the free end of the long arm of said lever. In its vertical movements (the saw may be cross-cutting a timber of varying cross-section, as for example a piece of molding or curved stock) the hood or casing 4 is guided by the rigid arms 13 between which it is mounted, the hood readily yielding to any cross-section of stock because of the weight W which keeps the lever 7 nicely balanced. The ejector member 22 through the slot $s''$ of which the saw freely operates, and the legs of which encompass the saw, may be considered as supplementing the function of the hood 4 as a guard, because to the extent that the hood would leave the saw exposed after the board and the piece severed therefrom were removed, to that extent the bounding legs of the ejector cover the saw as the carriage is being pulled back to its original position upon the completion of the sawing operation. At the same time the ejector pushes back the severed section to its original position in front of the hood 4. The strap 2 permits the feeding of the lumber the full extent, straddling as it does the sides of the hood with a full forward or feed stroke of the carriage. The purpose of the groove or depression $d$ in the roof of the hood 4 will be apparent from the dotted position of the parts in Fig. 1. In the event the hood is lifted to any material extent, the lever 7 will enter the groove and thus prevent lateral displacement or wabbling of the hood, for it must be obvious that with an excessive lifting of the hood the major portion thereof will be above the guide arms 13, and some means should therefore be provided to keep the hood in a vertical plane. This is done by the lever 7 settling down into the depression $d$.

In the above embodiment of the invention, the saw is used as a cross-cut. In the event the same is used as a rip saw for cutting boards lengthwise, the ejector member is not necessary; so too, the carriage may be dispensed with. In Fig. 8 is illustrated diagrammatically the application of a board B'. The board is fed lengthwise, the links 16 guiding the same under the hood 4 and to the saw.

It is to be understood of course that I do not limit myself to the details here shown as they may be changed considerably by the skilled mechanic without involving a departure from the nature or spirit of the invention.

Having described my invention what I claim is:

1. In combination with a circular saw rotating in a given plane, a hood surrounding the saw and yieldable in said plane, a reciprocable carriage for the stock to be cut, a supporting bed or frame for the carriage, and a member coupled to the carriage interposed between the bed and bottom of the hood along the face of the saw for pushing the section severed from the stock on the forward or feed stroke of the carriage to a point beyond the cutting edge of the saw with a backward stroke, said member on such backward stroke covering the otherwise exposed portion of the saw between the bed and bottom of the hood.

2. In combination with a circular saw rotating in a given plane, a hood surrounding the saw and yieldable in said plane, a reciprocable carriage for the stock to be cut, a supporting bed or frame for the carriage, and a member on the carriage provided with a longitudinal slot open at one end and loosely embracing the faces of the saw received by said slot, interposed between the bed and bottom of the hood, the front end of said member serving to push the section severed from the stock on the feed stroke of the carriage to a point beyond the teeth of the saw on the return stroke, and at the same time cover the otherwise exposed portions of the saw between the bed and bottom of the hood.

3. In combination with a supporting bed, a rotary saw mounted thereon and extending partially above the plane of the bed, a hood surrounding the saw and spaced from the bed, a reciprocable feed carriage, and a reciprocating member actuated by the carriage interposed between the bed and bottom of the hood for ejecting with a given stroke of the carriage the section severed from the stock on a previous stroke, and at the same time covering the otherwise exposed portions of the saw blade between the bed and bottom of the hood.

4. In combination with a supporting bed, a rotary saw mounted thereon and extending above the plane of the bed, a vertically yielding casing or hood surrounding the portion of the saw above the bed and spaced from the bed, a reciprocable feed carriage, a slotted ejecting member coupled to the carriage and loosely embracing the faces of the saw, interposed between the bed and hood, one end of the slot of said member being closed, said member operating to force outwardly to a point beyond the saw edge, the section severed from the stock on the feed stroke, with a return stroke of the carriage, and at the same time cover the otherwise exposed portions of the faces of the saw between the bed and bottom of the hood, and a stud or pin on the bed traversing the slot of the ejecting member for limiting in one direction the movement of the said member and of the carriage to which the member is secured.

5. In combination with a supporting bed, a vertically rotating saw mounted thereon and having a portion projecting above the bed, a vertically yielding hood surrounding said projecting portion, a reciprocable carriage on the bed for supporting the stock and feeding the same to the saw with a forward stroke of the carriage, a vertically oscillating lever disposed in the plane of rotation of the saw fulcrumed at an intermediate point of its length and having one arm hinged to the top of the hood at the front end thereof, a pair of rigid arms disposed parallel to the plane of rotation of the saw and loosely spanning and guiding the hood in its vertical movements, and projecting a suitable distance forward of the top of the hood, a threaded pin connecting the free ends of said arms, a pair of downwardly and inwardly inclined links spaced apart and provided at their outer ends with slots for the loose passage therethrough of the pin aforesaid, the opposite or inner ends of the arms being pivotally coupled to the bottom of the front end of the hood below the hinged connection of the lever arm there-with, the bottoms of the walls of the hood terminating in straight edges spaced from the bed, an ejecting member adjustably secured to the carriage and provided with a longitudinally disposed slot open at the front end for loosely receiving the saw, interposed between the bed and the bottom of the hood, the front end of the member forming a bearing for one side of the stock deposited on the carriage, a cross rail on the carriage for engaging the opposite side of the stock, a threaded pin connecting the inner or lower ends of the links coupled to the hood, an indicator strip or plate interposed between the links and having its ends loosely traversed by the threaded pins at the opposite ends of the links, nuts on the pins disposed on opposite sides of the indicator strip for centering or adjusting the same to the plane of rotation of the saw, a fixed support for the lever and rigid arms aforesaid, and a stop on said support for engaging the bottom of the inner arm of the hood-supporting lever to prevent undue vertical dislodgment of the hood during the sawing operation, the inclined links and hood freely yielding to the stock fed to the saw to permit the stock to pass under the hood, the front end of the ejecting member, with a return stroke of the carriage pushing the section severed from the stock to the front end of the hood, and a pin on the bed traversing the slot of the ejecting member and engaging the closed end of the slot when the front end of the member reaches the corresponding end of the hood with a return stroke of the carriage.

6. In a device of the character described, an ejecting member for the severed pieces of stock comprising a longitudinally slotted bar, the front end of the slot being open, a longitudinally slotted parallel member secured to the bar adjacent the closed end of the slot thereof and offset from said bar, as set forth.

7. In a device of the character described, a guard for a circular saw comprising a casing or hood surrounding the saw and maintained a suitable distance above the plane of the bed traversed by the saw, and a complementary reciprocating member loosely embracing the saw and interposed between the bed and bottom of the hood.

8. In a device of the character described, a supporting bed, a reciprocable carriage thereon, a circular saw mounted on and projecting partially above the bed, and above the carriage, a fixed support, a hood secured to said support and surrounding the saw, the bottom of the hood being spaced from the bed, and a complementary reciprocating member secured to the carriage and loosely embracing the saw interposed between the bed and bottom of the hood.

9. In a device of the character described, a supporting bed, a reciprocable carriage thereon, a circular saw mounted on and projecting partially above the bed, and above the carriage, a fixed support, a vertically yielding hood suspended from said support and surrounding the saw, and a reciprocating slotted ejecting member secured to the carriage and operating between the bed and bottom of the hood, said member with the return stroke of the carriage pushing back the section of the stock severed by the saw to the original position occupied by the stock in front of the hood.

10. In a sawing machine, a reciprocating carriage, an ejecting member carried by the same and engaging the portion of the stock to be severed by the saw, whereby upon a return of the carriage to original position the severed piece is pushed back with the main body of the stock to the original position occupied by the stock.

11. In a sawing machine, a circular saw, a reciprocating carriage for the support of the stock, a slotted ejecting member loosely spanning the saw and with its free end engaging the portion of the stock to be severed by the saw, whereby upon a return of the carriage to original position the severed piece is pushed back with the main body of the stock to the original position occupied by the stock out of reach of the saw.

12. In a sawing machine, a circular saw, a hood surrounding the same, and a reciprocating ejector operating as a complementary member to the hood for protecting the sides of the saw.

In testimony whereof I affix my signature, in presence of two witnesses.

GEORGE WIELAND.

Witnesses:
  EMIL STAREK,
  ELSE M. SIEGEL.